United States Patent

Baumann

[11] Patent Number: 5,826,896
[45] Date of Patent: Oct. 27, 1998

[54] WHEEL SUSPENSION FOR A MOTOR VEHICLE HAVING A WHEEL GUIDING LEAF SPRING

[75] Inventor: Hans-Uwe Baumann, Stuttgart, Germany

[73] Assignee: Dr. Ing. h.c.F. Porsche AG, Germany

[21] Appl. No.: 713,428

[22] Filed: Sep. 13, 1996

[30] Foreign Application Priority Data

Sep. 13, 1995 [DE] Germany .................. 195 33 803.0

[51] Int. Cl.⁶ .................................................. B60G 11/02
[52] U.S. Cl. ........................ 280/124.171; 280/124.175; 267/52
[58] Field of Search ................... 280/719, 720, 280/124.171, 124.175; 267/52, 260

[56] References Cited

U.S. PATENT DOCUMENTS

| | | |
|---|---|---|
| 1,810,319 | 6/1931 | Lundelius et al. . |
| 2,697,613 | 12/1954 | Giacosa . |
| 3,149,855 | 9/1964 | Adloff et al. . |
| 3,377,060 | 4/1968 | Sherwood .................................. 267/52 |
| 3,645,555 | 2/1972 | Traylor ...................................... 267/52 |
| 4,598,900 | 7/1986 | Yamamoto et al. . |
| 4,725,074 | 2/1988 | Stevens .................................... 280/719 |
| 5,062,620 | 11/1991 | Martone ................................... 280/719 |
| 5,401,054 | 3/1995 | Phillips .................................... 267/52 |

FOREIGN PATENT DOCUMENTS

| | | |
|---|---|---|
| 0 137 096 A2 | 3/1984 | European Pat. Off. . |
| PS 922 272 | 1/1955 | Germany . |
| AS 11 46 380 | 7/1960 | Germany . |
| 3332952A1 | 3/1985 | Germany . |
| 34 15 125 A1 | 10/1985 | Germany . |
| WO 87/01339 | 3/1987 | WIPO . |

*Primary Examiner*—Kenneth R. Rice
*Attorney, Agent, or Firm*—Evenson, McKeown, Edwards & Lenahan, P.L.L.C.

[57] ABSTRACT

The transverse leaf spring of the wheel suspension is held in bearings on both sides of a longitudinal center plane of the vehicle. These bearings consist of semicylindrical tension elements which are held in elastic receiving devices and which are surrounded by bearing bushes. In order to securely clamp the leaf springs toothed profiles are provided in the tension elements and in the leaf spring. The tension elements can also be connected with pins which can be fastened in the leaf spring.

12 Claims, 6 Drawing Sheets

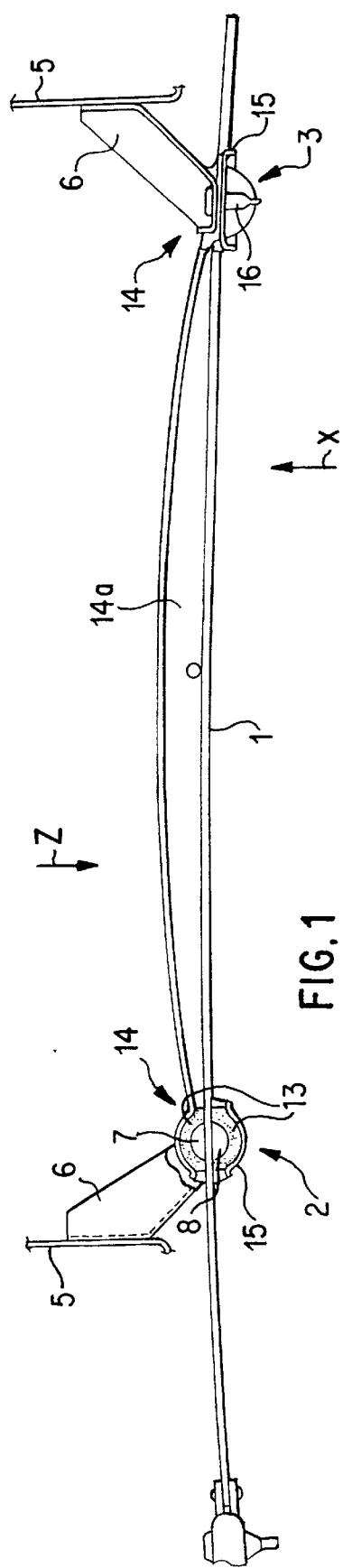
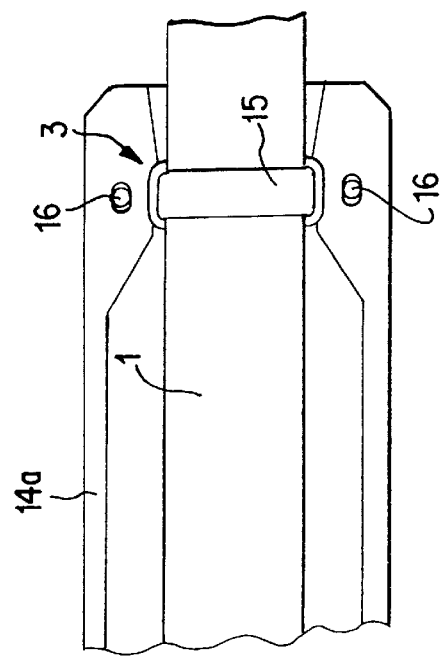
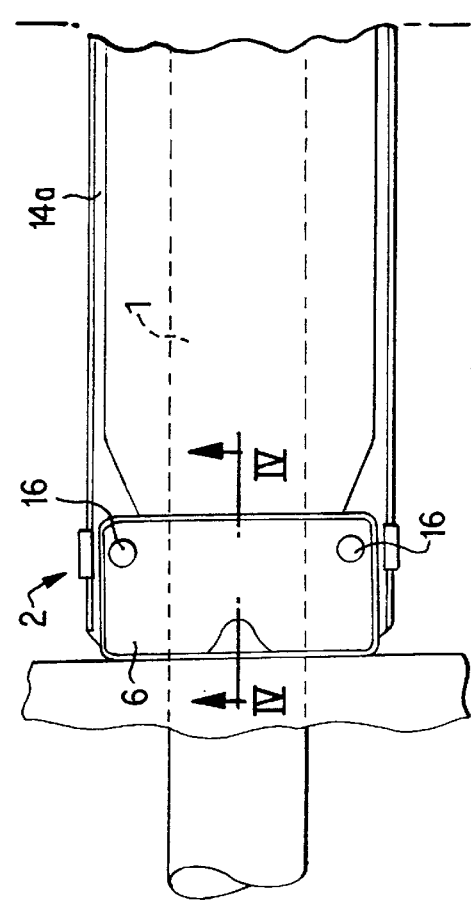
FIG. 1
FIG. 2
FIG. 3

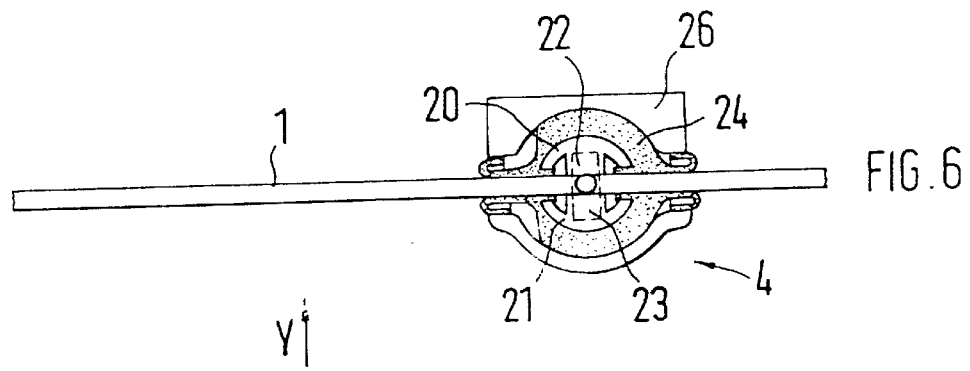
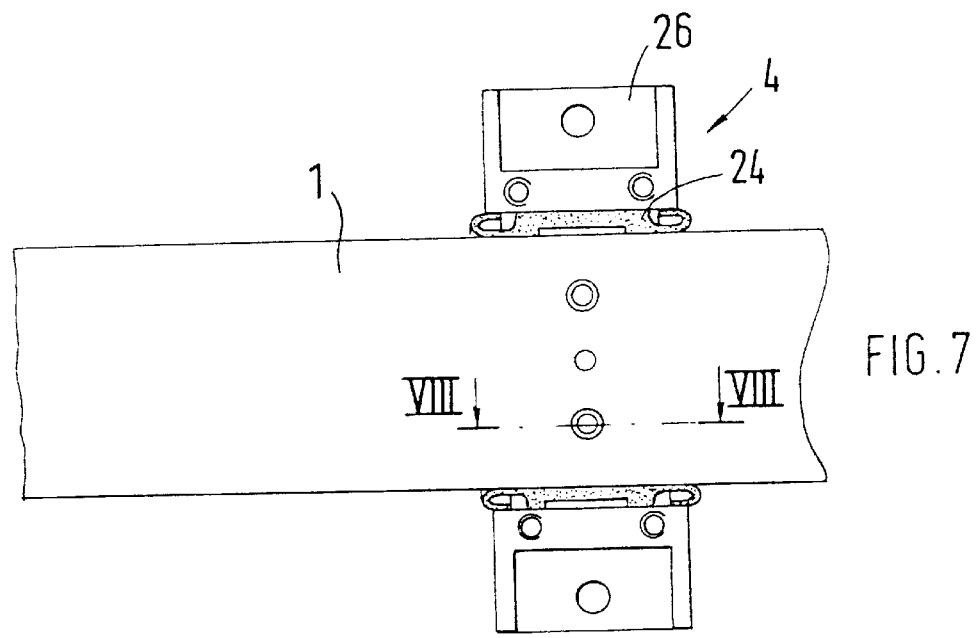
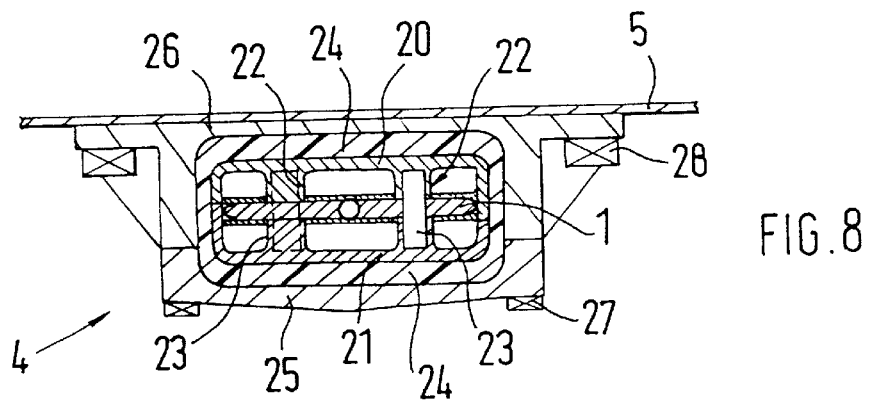

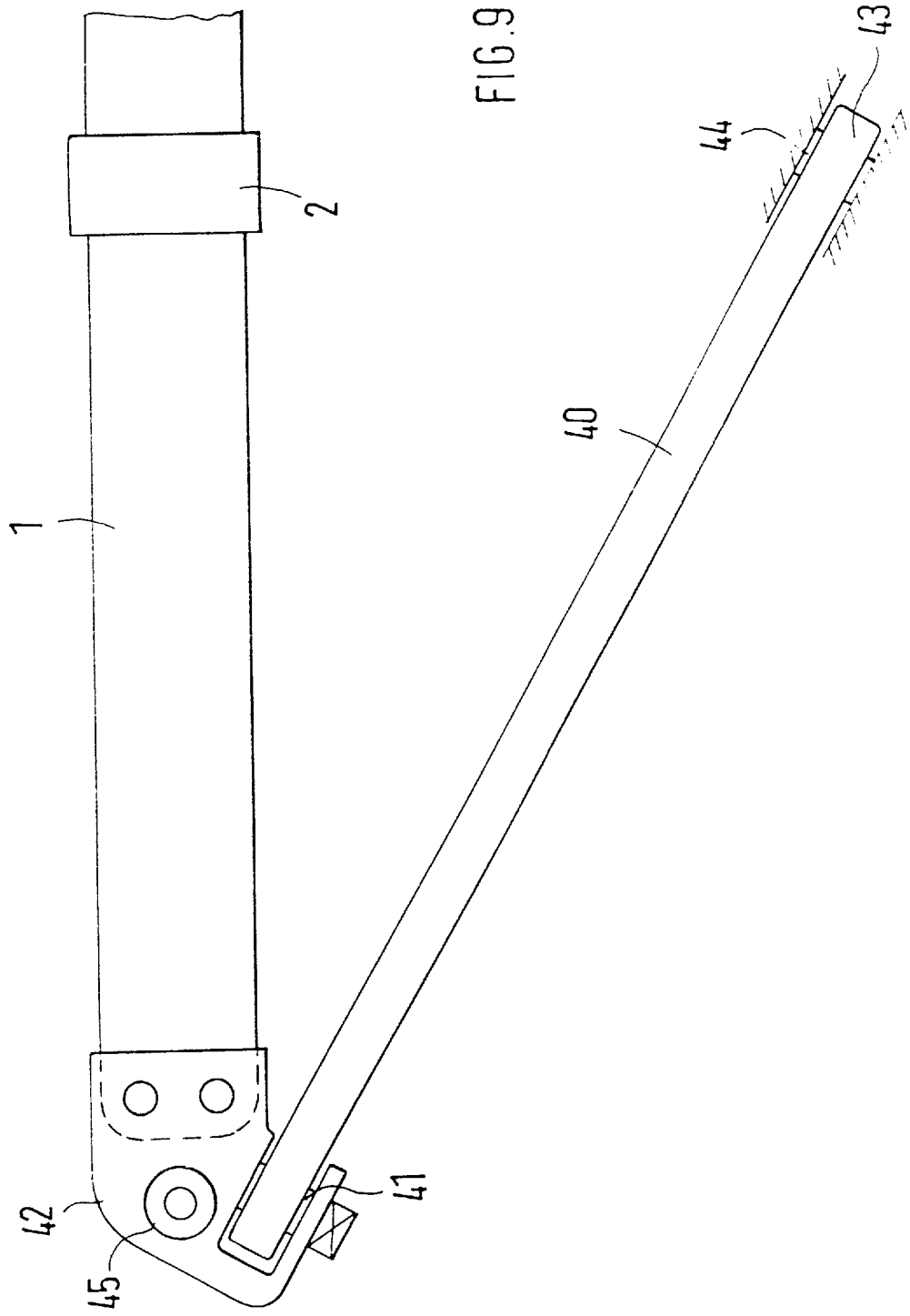

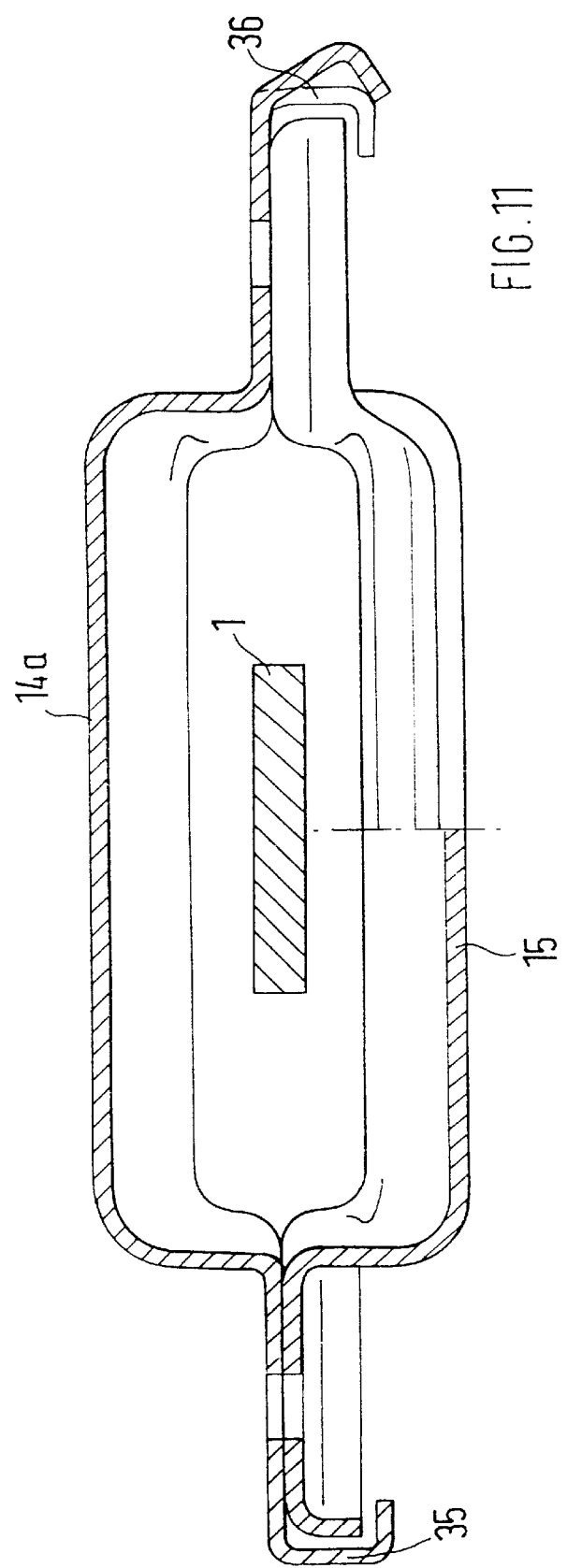

WHEEL SUSPENSION FOR A MOTOR VEHICLE HAVING A WHEEL GUIDING LEAF SPRING

BACKGROUND AND SUMMARY OF THE INVENTION

This invention relates to a motor vehicle wheel suspension of the type having a wheel-guiding leaf spring arranged transversely with respect to the vehicle.

U.S. Pat. No. 2,697,613, discloses a leaf spring for a wheel suspension of a motor vehicle, which is clamped on both sides of a longitudinal center plane of the vehicle, in body-side bearings. The free spring ends are pivotally connected in a wheel carrier, and body-side bearings of the is leaf spring reach around elastic elements which are arranged between bearing bushes and rest directly against the leaf spring.

It is an object of the present invention to provide a transverse leaf spring arrangement for a wheel suspension of a motor vehicle which permits a movement in the driving operation in body-side bearings without large resistances, and in which the bearings are constructed and mountable in a simple manner.

This and other objects and advantages are achieved by the transverse leaf spring arrangement according to the invention, in which a two-sided bearing of the leaf spring between semicylindrical tension elements that are held by bearing bushes in elastic receiving devices, permits spring movements without significant resistance. Even high to very high forces and moments can be absorbed in all directions with a slight deformation. Length differences of the leaf spring between the two bearings in the case of a deflection (zero passage) are possible largely without any clamping. Also, in the case of a plastic spring, a fastening at the clamping points by way of the bearings is ensured without any damage to the plastic surface.

The one bearing bush arranged on the top side of the leaf spring covers the leaf spring to the bearing points and has a convexly curved construction so that the leaf spring which arches in the driving operation has a corresponding clearance. The bearing bush may be constructed as a sheet metal bush or may consist of a casting.

According to the invention, the bearing points for the leaf springs can also be provided in a front axle carrier, and are then closed off by bearing caps.

The bearing bushes for the semicylindrical tension elements and the surrounding elastic receiving devices are rounded in a corresponding manner. The elastic receiving devices can be vulcanized onto the tension elements. A joint vulcanization of the tension element with the elastic receiving device and the bearing bush is possible.

The tension elements can be secured against slipping, either by way of corresponding toothing profiles together with the leaf spring, or the tension elements are held on the leaf spring by means of pins. In this case, the pins are fixed in bores of the leaf spring and are fitted into molded-on sleeves of the bearing bushes, which are connected together by way of fastening screws with consoles held on the vehicle body.

By means of the elastic receiving devices and/or of the interior shape of the bearing bushes, the characteristics of the bearing can be adapted to the design requirements.

Thus, for example, by way of pockets, a high stiffness in the case of outer lateral forces and lower stiffnesses in the case of an interior length compensation (zero passage) can be achieved.

Advantageously, the semicylindrical tension elements can also have projections which are arranged on the ends thereof and have a complementary shape, so that when the tension elements are joined, they combine to form a continuous surface. The leaf spring will then be held and guided between these projections on the ends of the tension elements. The elastic receiving devices may be constructed in two parts, so that a rapid and simple mounting becomes possible because these elastic elements can then be fitted onto the tension elements from the front side.

For additional support and for the exact wheel suspension, the transverse leaf spring can have a control arm which is set at an angle, arranged near the guiding joint, and can be disposed together with the guiding joint in a head bearing. This head bearing is fixedly connected with the leaf spring.

Other objects, advantages and novel features of the present invention will become apparent from the following detailed description of the invention when considered in conjunction with the accompanying drawings.

BRIEF DESCRIPTION OF THE DRAWINGS

FIG. 1 is a front view of a transverse leaf spring with bearings;

FIG. 2 is a bottom view of the leaf spring of FIG. 1, in the direction of the arrow X;

FIG. 3 is a top view of the leaf spring of FIG. 1, in the direction of the arrow Z;

FIG. 6 is a frontal view of another embodiment of a bearing for the leaf spring;

FIG. 7 is a bottom view of the embodiment of FIG. 6, in the direction of the arrow Y;

FIG. 8 is a sectional view of the bearing point, along Line VIII—VIII of FIG. 7;

FIG. 9 shows the construction of a transverse leaf spring with a connected control arm;

FIG. 11 is a representation of the top-side bearing bush constructed as a cross member in connection with the bottom-side bearing bush.

DETAILED DESCRIPTION OF THE DRAWINGS

As shown in FIG. 1, a wheel suspension of a motor vehicle (not shown) comprises a leaf spring 1 which is arranged transversely in the vehicle and which, on both sides of a longitudinal center plane X—X of the vehicle (FIG. 2), is supported in bearings 2, 3 (FIG. 1) and 4 (FIGS. 6, 7) in the direction of the vehicle body 5, and is connected with the body by way of a console 6.

Figure 4:
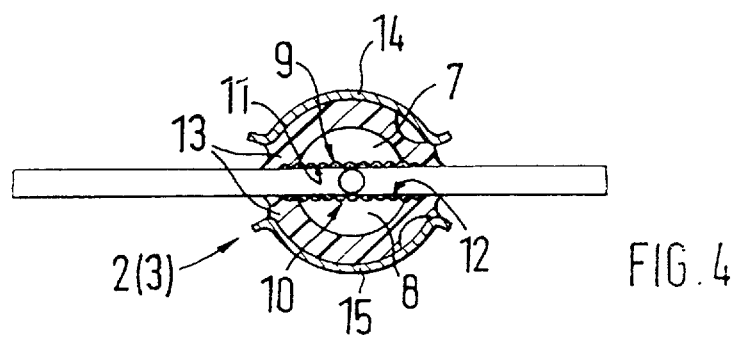
FIG. 4 is a sectional view along Line IV—IV of FIG. 3, without a body-side console.
Figure 5:
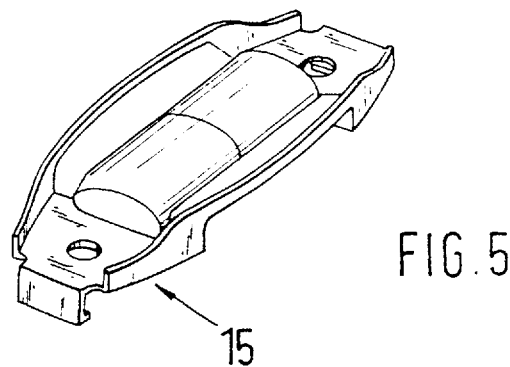
FIG. 5 is a perspective view of a bottom-side bearing bush.

Each of the bearings 2, 3 of the embodiment according to FIGS. 1 to 5 consists of two semicylindrical tension elements 7, 8 which extend transversely to the leaf spring 1, clamping it between substantially planar surface sections 9, 10 (FIG. 4). Mutually corresponding toothing profiles 11, 12 are provided in the surface sections 9, 10 of the elements 7, 8 and/or of the surfaces of the leaf spring 1, to prevent slipping of the leaf spring 1 in the bearing points.

The tension elements 7, 8 are surrounded by elastic receiving devices 13 which are held in bearing bushes 14, 15 of the bearings 2, 3. The bearing bushes 14, 15 and the elastic receiving devices 13 have a shape which corresponds to the semicylindrical shape of the tension elements 7, 8.

The bearing bushes 14 arranged on the top side of the leaf spring 1 are constructed as cross members 14a and on their free ends have molded-in bearings for the tension elements 7, 8. The cross member is convexly curved and forms a clearance with respect to the leaf spring 1.

The bearing bushes 15 on the bottom side of the leaf spring 1 are disposed opposite the upper bearings 14, and consist of an oblong part. The two opposite bearing bushes 14, 15 are fastened on the console 6 by means of screws 16.

Figure 10:
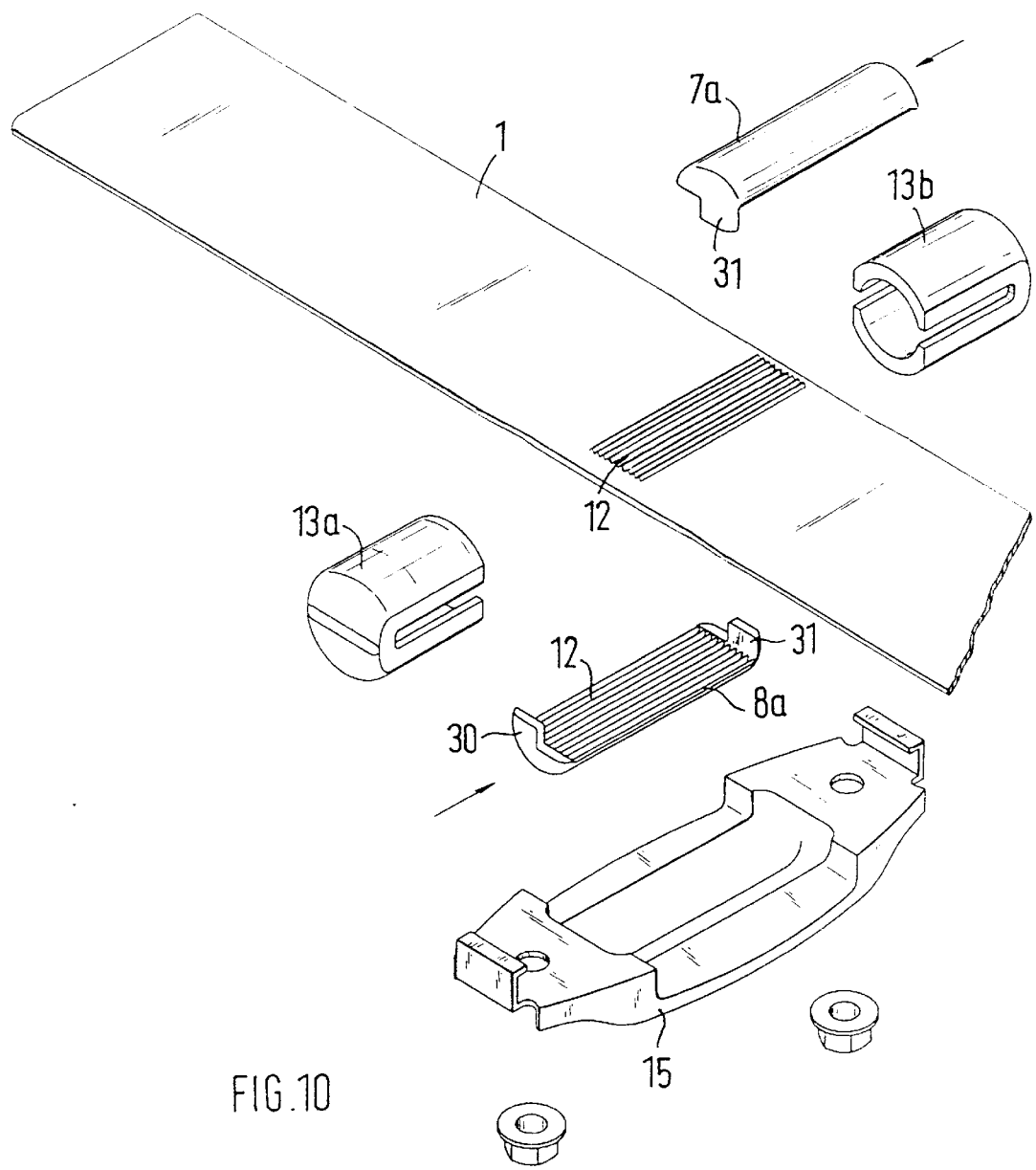
FIG. 10 is an exploded perspective view of another embodiment of a bearing for the leaf spring with tension elements, elastic receiving devices and a bearing bush.

FIG. 10 illustrates another embodiment of a bearing 2, 3 for a leaf spring 1. In this embodiment, the semicylindrical tension elements 7a, 8a each have half-side projections 30, 31 which project away on the front side. When the tension elements 7a, 8a are joined, these half-side projections complement one another to form a continuous end surface, closing off the ends of the tension element. At the same time, these projections ensure a firm hold on the leaf spring and guide it.

The elastic receiving devices 13a, 13b for the tension elements 7a, 8a can be constructed in two parts and are fitted from the ends of the tension elements 7a, 8a on these tension elements in the direction of the arrows.

FIGS. 6 to 8 illustrate another embodiment of a bearing 4 for a leaf spring 1. Only one bearing 4 is shown. The bearings 4 are arranged on the leaf spring corresponding to the bearings 2, 3 of the embodiment according to FIG. 1.

On the interior, the tension elements 20, 21 are equipped with molded-on sleeves 22 which are situated opposite one another and clamp the leaf spring 10 between one another. The sleeves 22 (and therefore the tension elements 20, 21) are connected with one another by way of pins 23 held in the leaf spring 1. On their interior, the surrounding bearing bushes 25, 26 each have an elastic receiving device 24. These surround the semicylindrical tension elements 20, 21 and are connected with one another by way of screws 27. The assembly is fastened on the vehicle body by additional screws 28. The tension elements 20, 21 are bush-shaped, and the sleeves 22 project therefrom in a freestanding manner.

FIG. 11 shows the cross member 14a with the top side bearing bushes 14 in connection with the bottom-side bearing bushes 15. These are connected by way of bent flanges 35, 36 of the cross member 14a, which reach around the edges of the bearing bushes 15 in a clamping manner.

The leaf spring 1 can also be connected with the bearings 2, 3, 4 by means of a control arm 40 on the end side as shown in FIG. 9. This control arm 40 is pivotally connected by a bearing 41 in a head bearing 42 which is also fastened to the leaf spring 1. The free end 43 of the control arm 40 is held by way of another bearing 44 on the vehicle body. A guide joint 45 is arranged in the head bearing 42.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A wheel suspension arrangement for a motor vehicle comprising:

a wheel guiding leaf spring adapted to be connected on a vehicle body and arranged transversely thereto, free ends of said leaf spring being connectable to a wheel carrier;

substantially flat surface portions of said leaf spring being secured to said vehicle by pairs of semicylindrical tension elements situated transversely on said leaf spring on opposite sides of a vertical longitudinal center plane of the vehicle, each pair of semicylindrical tension elements comprising first and second semicylindrical tension elements disposed on a substantially flat surface portion of said leaf spring; and said semicylindrical tension elements being arranged in surrounding bearing bushes by means of oppositely disposed receiving devices.

2. Wheel suspension according to claim 1 wherein said leaf spring comprises a plastic material.

3. Wheel suspension according to claim 1 wherein first bearing bushes disposed on a top side of the leaf spring are arranged in a cross member which has rounded bearings for the tension elements embedded in the elastic receiving devices.

4. Wheel suspension according to claim 3 wherein:

the cross member has a convex curved shape in a portion thereof between the bearing bushes; and in the area of the bearing bushes, each cross member can be connected with a console, which can be fixed on the body side, as well as with another bearing bush arranged on the bottom side of the leaf spring.

5. Wheel suspension according to claim 4 wherein bearing bushes arranged on a bottom side of the leaf spring each consist of an oblong part which receives the semicylindrical tension element and can be connected by way of screws with the cross member and the console.

6. Wheel suspension according to claim 1 wherein the semi-cylindrical tension elements are arranged with substantially planar surface sections thereof adjacent said substantially flat surface portions of the leaf spring, and have toothed profiles which interact in the planar surface sections in the leaf spring.

7. Wheel suspension according to claim 1 wherein the semi-cylindrical tension elements are bush shaped, have opposite sleeves on an interior side thereof between which the leaf spring is clamped, and hold pins which are connected with the leaf spring.

8. Wheel suspension according to claim 7 wherein the tension elements are held in elastic receiving devices which are received by the bearing bushes connected with one another by means of screws.

9. Wheel suspension according to claim 1 wherein the leaf spring is connected on each end with an additional control arm, which is set at an angle and which is held by way of a bearing in a head bearing, the head bearing being fixedly connected with the spring end.

10. Wheel suspension according to claim 1 wherein the receiving devices are constructed in two parts whereby each receiving device can be fitted from the front side onto the tension elements.

11. Wheel suspension according to claim 1 wherein a top-side bearing bush constructed as a cross member reaches around and clamps the additional bottom-side bearing bushes on the edge side by means of flanges.

12. A wheel suspension arrangement for a motor vehicle comprising:

a wheel guiding leaf spring disposed on a vehicle body and arranged transversely thereto, free ends of said leaf spring being connected to a wheel carrier;

said leaf spring being secured to said vehicle by pairs of semicylindrical tension elements situated transversely on said leaf spring on opposite sides of a vertical longitudinal center plane of the vehicle; and said semicylindrical tension elements being arranged in surrounding bearing bushes by means of oppositely disposed receiving devices;

wherein the semicylindrical tension elements extend beyond edges of the leaf spring from both sides, each of said tension elements having a projecting half-side projection, which projections can be joined to form a continuous end surface in the connected condition.

* * * * *